United States Patent [19]
Rio et al.

[11] 3,885,979
[45] May 27, 1975

[54] CEMENT PRODUCTS

[75] Inventors: Arturo Rio; Marcello Cerrone; Alberto Saini, all of Colleferro, Italy

[73] Assignee: Societa' Italiana per Azioni per la Produzione di Calci e Cementi di Segni, Rome, Italy

[22] Filed: Feb. 11, 1974

[21] Appl. No.: 441,661

[30] Foreign Application Priority Data
Aug. 6, 1970 Italy ............................... 52712A/70
Aug. 8, 1970 Italy ............................... 52749A/70

[52] U.S. Cl. ..................... 106/89; 106/97; 106/98; 106/120
[51] Int. Cl. ............................................. C04b 7/02
[58] Field of Search ................. 106/89, 97, 98, 120

[56] References Cited
UNITED STATES PATENTS
2,699,097  1/1955  Binkley ............................ 106/120
3,472,668  10/1969  Pfeifer et al. ....................... 106/120
3,501,323  3/1970  Moorehead ........................... 106/98

*Primary Examiner*—J. Poer
*Attorney, Agent, or Firm*—Young & Thompson

[57] ABSTRACT

A process for the manufacture of cement products with a very high mechanical resistance, wherein products manufactured with portland cements or with mixtures comprising from 50 to 90% of portland cement and from 50 to 10% of reactive siliceous materials are submitted, after the usual preageing at environment temperature, to a treatment with steam under pressure and subsequently to a thermal treatment in an anhydrous environment; and cement products with a very high mechanical resistance, manufactured with the above process wherein they comprise a high content of hydrated calcium silicates corresponding to the tobermorytic form 11 A. The products can be impregnated with a polymerizable substance which is polymerized inside the products themselves.

1 Claim, No Drawings

CEMENT PRODUCTS

This is a continuation, of application Ser. No. 166,298, filed July 26, 1971 and now abandoned.

The present invention concerns improvements in cement products. In particular the present invention covers a process for the manufacture of cement products endowed with very high mechanical resistance after very short ageing, and the products thus obtained.

It is known that treatment of cement products with steam increases considerably the speed of the hydration process and permits to obtain, in a few hours, cement products very resistant mechanically and more stable dimensionally. Normally two hydrothermal treatments are carried out: one at low pressure, with temperatures of up to 100°C; the other in autoclave with the use of saturated steam and at thermal levels exceeding 175°C.

The use of such techniques even if fulfils the requirements of particular fields of application, does not succeed in satisfying, however, some sectors of particular utilization which require from a cement product structural and mechanical characteristics superior to those which, normally, are required from cement products.

The present invention envisages the realization of a process allowing to obtain, in a very short time, cement products endowed with very high mechanical resistance.

Such a process consists essentially of subjecting products manufactured from portland cements or from mixtures of same with reactive siliceous materials, after a preliminary ageing at environment temperature, to an initial treatment with steam under pressure at temperatures ranging from 150° to 250°C, for 1-6 hours and then to a second thermal treatment, in anhydrous enviroment, at temperatures ranging from 120° to 350°C, for 1-12 hours.

It has been observed in fact, that when a hydrothermal treatment in autoclave is followed by a thermal treatment in anhydrous environment at the temperature intervals and for the time hereinbefore indicated, the mechanical resistance, already intrinsically high of the products based on the hereinbefore said binders, displayed a further substantial increase reaching values ranging from 950 to 1500 kg/cm$^2$, according to the binder composition and to the temperature and duration of the thermal treatment.

For the manufacture of the products, according to the present invention, a particular suitability is displayed by portland cements with a high siliceous modulus, preferably higher than 3, characterized by the presence of a high percentage - higher than 78–80 percent - of calcium silicates and by a moderate content - lesser than 15–18 percent - of the ferric-aluminic phases.

In portland cement-reactive siliceous material mixtures, the respective proportions can vary from 50 and 90% to 50 and 10%, depending on the characteristics of the material available and on the properties required for the final product.

Some reactive siliceous materials, very rich in silica (above 90%), obtained from processing of trachytic rocks, materials which display also considerable pozzolana properties, are particularly advantageous for the purposes of the present invention.

Excellent results are obtained equally, using directly pozzolana cements prepared with the hereinbefore said materials and already available on the market.

The possibility of obtaining, in a very short time, even less than 12 hours, cement products endowed with very high mechanical characteristics is particularly useful in the prefabrication, as it allows, under equal stresses, the use of lighter structures with reduced dimensions and it is clearly linked not only with the thermal treatment, but also with the nature of the pozzolana or siliceous addition used.

The mechanical resistance obtainable, increases with the passage from the use of normal portland cements to portland cements with a high silicic modulus and from the latter to mixtures of portland cements with reactive pozzolana or siliceous additions, in dependence of the quantity and quality of the addition itself.

The different results obtainable with mixed cements containing siliceous materials with different mineralogic nature and origin, impart to these materials a fundamental influence on the process according to the present invention. In fact, it has been ascertained experimentally that the optimization of the resistance values is linked with the use of materials with a siliceous component which must be neither excessively crystalline nor excessively amorphous; therefore the best results are obtained when in the product a suitable ratio between the amount of amorphous gels and that of the crystalline components can be created.

An excessive amount of crystalline components tends, in fact, to increase the brittleness of the product, while a decrease of the mechanical resistance occurs when there is a prevalence of the amorphous component on account of the lesser capacity of the latter to endow the hydrosilicate compounds that are forming with a mechanically resistant "skeleton" base.

Given the same qualitative and quantitative composition of the siliceous material used, even an incorrect choice of the conditions of the initial hydrothermal treatment can bring about an amorphous-crystalline ratio different from the optimal ratio. The subsequent thermal treatment emphasizes this situation, therefore it has to be assumed that the second thermal treatment affects, above all quantitatively, the various phases present, formed in the course of the hydrothermal treatment.

The surprising increase of the mechanical properties obtained at the end of the second thermal treatment, was the object of both thermoanalytical and spectrometrical investigations.

The thermal differential analysis clearly emphasizes how, with the progress of the treatment, the hydrosilicate structures tend generally towards phases characterized by lower and lower C/S ratio and therefore, with a higher condensation degree.

The thermograms indicate in fact, that the peak temperature (865°C) characterizing these structures, tends to shift toward lower values, accompanied, however, by a display of a clearer definition of the peak itself, which is an index of a further and more complete CaO-SiO$_2$ combination. Therefore, there would result in the hydration products an enrichment of the tobermorytic form 11 A, which is responsible, as it is known, for the higher mechanical resistance.

The examination of the thermograms in the low temperatures zone (150–400°C) indicates that the second thermal treatment involves a considerable reduction of an entire exothermic zone which extends in the hereinbefore said interval with a very poorly accentuated maximum inside the 350°C area. This zone is attributable to water of the interstratum type, which has a shape of a monomolecular lamina with a thickness of a few A, and is linked, very probably, through Van der Vaals type bonds, with the granules constituting the product.

As a confirmation of this hypothesis, the I.R. spectra emphasize how the process, which involves the formation of surprisingly resistant mechanical structures, affects essentially the water present among the silicate structures, while the second thermal treatment weakens considerably the bending vibration at 1,650 $cm^{-1}$, characteristic of the hydroxyl group and attributed by some Authors just to interstitial water.

The examination performed on test pieces of plastic mortar type I.S.O., has given satisfactory results also, as far as it concerns other mechanical characteristics, such as resistance to the flexion dimensional stability, resistance to freezing and thawing cycles, resistance to abrasion etc.

As far as granulometry of the inert materials to be used in the manufacture of the products is concerned, an assorted granulometric curve, originating a mixture with maximum compactedness, with the least possible vacua volume, is advisable.

The binder dosage is related to the maximum dimensions of the agglomerate and to the characteristics required from the product.

The water/cement ratio must be the lowest possible, compatibly with the workability requirements of the mortar as related to the shape and to the eventual reinforcement of the product.

With regard to the nature of the inert materials, siliceous, siliceous-calcareous basaltic materials are advisable, while lesser resistance is obtained with purely calcareous or dolomitic materials, probably because of the bonds of different nature which can be established between the binder and the inert material in the first case, among which are essential those $CaO-SiO_2$.

The duration of the preageing at environment temperature, after the pouring of the casting and before the autoclave treatment, can vary within extensive limits, according to the production program, the quality of the binder used, the consistency of the mortar, the dimensions of the product. In any case it is advisable to conduct this preageing for not lesser than 3–6 hours.

The products thus obtained display mechanical resistance that is very high, and clearly superior to that of normal conglomerates, reaching values of about 1500 $kg/cm^2$. These products display, furthermore, a considerable degree of microporosity. Comparison measurements performed on conventional conglomerates and on conglomerates prepared in the hereinbefore said matter, displayed for the latter, not only a greater absolute porosity value, but also a different pores distribution, corresponding to a diffused microporosity. Thus, while the total porosity reaches values of the order of $10^{-1}$ cc/g the examination of the pores distribution shows a shifting of the curve towards the lesser diameters.

By impregnating these products, according to the present invention, with polymerizable substances, a degree of imbibition much greater than that obtainable in the normal conglomerates can be obtained, of the order of 10–15% by weight, thus obtaining with the subsequent polymerization a cement-resin composite, with properties clearly superior to those of the impregnated concretes known until now.

That being stated, it is planned to impregnate with polymerizable substances cement products manufactured as indicated hereinbefore and then to place the impregnated products into the conditions in which the in situ polymerization occurs.

Because of the special characteristics of the initial products - high degree of porosity and very high intrinsic mechanical resistance - composite products with exceptional mechanical and applicative properties are obtained. In fact, they are endowed with an extraordinary compactedness and they can display mechanical resistance of the order of 2500 $kg/cm^2$.

In the choice of the polymerizable substances to be used for the impregnation, it will be necessary, naturally, to take into account a whole series of factors, such as the monomer cost, its physical-chemical characteristics, its facility to polymerize, and finally the properties of the resulting polymer as related to the use for which the product is intended.

From the viewpoint of the physical-chemical characteristics, preference should be given to liquid monomers which display viscosities allowing a rapid and sufficiently easy penetration into the microscopic structure of the manufactured cement, and which do not require a too long polymerizaion time, thus not affecting excessively the process economy.

With regard to the choice of the monomer in connection with the use of the composite material, the chemical inertia and the softening temperature of the polymeric resin are assumed as stability indexes for the organic component within the interior of the product.

Excellent results are obtained, for example, using for the impregnation acrylic and metacrylic esters, vinylic esters, styrene, etc. Mixtures of copolymerizable monomers such as, for example, mixtures of styrene and methyl metacrylate, vinyl acetate, alpha-methylstyrene, di-vinylbenzene, acrylonitrile, etc. can be also used. Gaseous monomers, such as ethylene, can be also used if proper impregnation and polymerization techniques are adopted.

In order to facilitate the polymerization, suitable activators and eventually particular polymerization promoters also are preferably added to the monomeric charge.

Before the impregnation with the polymerizable substance, in order to facilitate its penetration and to increase, therefore, its quantity within the interior of the product, it is advantageous to place the latter into an autoclave and to maintain it under vacuum until a residual pressure of a few Hg mm is reached. Subsequently the imbibition operation is preferably performed under a pressure of some dozens of atmospheres ($N_2$), in such a manner as to reduce the imbibition time and to secure a deep and homogeneous penetration of the monomeric charge into the interior of the product.

By means of addition of dyes to the polymerizable substance, it is possible to verify the degree of penetration and to fix the minimum operation time, according to the dimensions and to the shape of the products.

The following examples are quoted to illustrate the present invention better, but they are not intended to have a limitative character.

Example No. 1

Mortars manufactured with A.R.C. pozzolana cement produced by the Applicant, and sand standardized according to the Italian specifications, proportioned in the 1:3 ratio, with a water/cement ratio = 0.5, submitted to the following ageing modalities:
 a. 12 hours of preageing at environment temperature
 b. Three hours treatment in autoclave at 215°C (20 atm.)
 c. 4 hours thermal treatment at atmospheric pressure at the temperature of 200°C,
displayed respectively the following mechanical resistance:
 855 kg/cm$^2$ at the end of treatment b)
 1.356 kg/cm$^2$ at the end of treatment c)

Example No. 2

Products manufactured according to example No. 1, using as a binder a mixture of portland cement with a high silicic modulus (3.10) and with a low modulus of melting materials (1.5) and sand with a high (90%)SiO$_2$ content in the proportions of 70:30, aged according to example No. 1, displayed respectively the following mechanical resistance:
 750 kg/cm$^2$ at the end of treatment (b)
 1.112 kg/cm$^2$ at the end of treatment (c)

Example No. 3

Products manufactured according to example No. 1, using as a binder normal portland cement with a high silicic modulus (3.10) and with a low modulus of melting materials (1.5), aged according to example No. 1, displayed respectively the following mechanical resistance:
 580 kg/cm$^2$ at the end of treatment (b)
 920 kg/cm$^2$ at the end of treatment (c)

Example No. 4

Products manufactured according to example No. 1, using as a binder normal portland cement, aged according to example No. 1, displayed respectively the following mechanical resistance:
 560 kg/cm$^2$ at the end of treatment (b)
 836 kg/cm$^2$ at the end of treatment (c)

Example No. 5

Products manufactured according to example No. 1 and aged according to the following modalities:
 a. 6 hours preageing at environment temperature
 b. 6 hours treatment in autoclave at the temperature of 180°C (12 atm.)
 c. 2 hours thermal treatment at atmospheric pressure, at the temperature of 300°C,
displayed, respectively, the following mechanical resistance:
 830 kg/cm$^2$ at the end of treatment (b)
 1.150 kg/cm$^2$ at the end of treatment (c)

Example No. 6

Products manufactured according to example No. 2 and aged according to the following modalities:
 a. 7 days preageing at environment temperature
 b. 2 hours treatment in autoclave at the temperature of 215°C (20 atm.)
 c. 3 hours thermal treatment at atmospheric pressure at the temperature of 250°C,
displayed respectively the following mechanical resistance:
 725 kg/cm$^2$ at the end of treatment (b)
 981 kg/cm$^2$ at the end of treatment (c)

Example No. 7

Concretes manufactured with A.R.C. pozzolana cement and basaltic inert materials, granulometrically corresponding to the Fuller curve (P = 100 $\sqrt{d/D}$), with maximum diameter of the aggregate = 10 mm, water/cement ratio = 0.50, binder/inert material ratio 1:5, submitted to the following ageing modalities:
 a. 12 hours preageing at environment temperature
 b. 3 hours treatment in autoclave at 215°C (20 atm.)
 c. 4 hours treatment at atmospheric pressure at the temperature of 200°C,
displayed the following mechanical resistance:
 825 kg/cm$^2$ at the end of treatment (b)
 1.250 kg/cm$^2$ at the end of treatment (c)

Example No. 8

Concretes manufactured according to example No. 7, using as a binder a mixture of portland cement with a high silicic modulus (3.10) and with a low melting materials modulus (1.5) and sand with a high (90%) SiO$_2$ content in the proportions 70:30, aged according to example No. 7, displayed respectively the following mechanical resistance:
 725 kg/cm$^2$ at the end of treatment (b)
 1.150 kg/cm$^2$ at the end of treatment (c)

Example No. 9

Concretes manufactured according to example No. 7, using calcareous inert materials, granulometrically corresponding to the Fuller curve (P = 100 $\sqrt{v/D}$) with a maximum diameter of the aggregate = 10 mm, water/cement ratio = 0.50, and with a cement aggregate ratio = 1.4, submitted to the following ageing modalities:
 a. 12 hours preageing at environment temperature
 b. 3 hours treatment in autoclave at 215°C (20 atm.)
 c. 4 hours thermal treatment at atmospheric pressure at the temperature of 200°C,
displayed respectively the following thermal resistance
 646 kg/cm$^2$ at the end of treatment (b)
 85 kg/cm$^2$ at the end of treatment (c)

Example No. 10

Concretes manufactured with the following modalities: binder consisting of a mixture, in the proportions 70:30, of portland cement with a high silicic modulus (3.10) and with a low melting materials modulus (1.3) and sand with a high (90%) SiO content, basaltic inert materials granulometrically corresponding to the Fuller curve (P = 100 $\sqrt{d/D}$), with a maximum diameter of the aggregate of 10 mm binder/inert materials ratio by weight = 1.5 water/binder ratio = 0.50 submitted to the following ageing modalities:
 a. 12 hours at environment temperature
 b. 3 hours treatment in autoclave at 215°C (20 atm.)
 c. 4 hours thermal treatment at atmospheric pressure at the temperature of 200°C,
displayed after the treatments a mechanical resistance of 1,250 kg/cm$^2$ and a total porosity of 0.0625 cc/g.

The hereinbefore said concretes have been subsequently submitted to about 1 mm Hg of residual pressure.

After imbibition by immersion under vacuum into methyl metacrylate properly added (0.1 dimethylaniline + 1% benzoyl peroxide), a pressure of about 50 atm. (N$_2$), has been applied to the autoclave in such a manner as to complete rapidly the monomer penetration. After impregnation the products were wrapped in aluminum foils to reduce the evaporation losses of the monomer during the thermopolymerization and then they were thermically treated at 66°C for 15 hours.

At the end of the treatment the products displayed the following characteristics:

| | | |
|---|---|---|
| a) | degree of impregnation | = 11% by weight |
| b) | Mechanical resistance to compression | 1,850 kg/cm² |
| c) | Water absorption | = 0.15 % |
| d) | Abrasion (ASTM C 4 18-68) | = 2 g |

Example No. 11

Mortars manufactured with A.R.C. pozzolana cement and sand standardized according to the Italian specifications, proportioned in the ratio 1:3 with a water/cement ratio = 0.50, submitted to the following ageing modalities:

a. 12 hours preageing at environment temperature
b. 3 hours treatment in autoclave at 215°C (20 atm.)
c. 4 hours thermal treatment at atmospheric pressure at the temperature of 200°C, displayed at the end of the treatments the following characteristics:

| | |
|---|---|
| Mechanical resistance to compression | = 1,356 kg/cm² |
| Porosity | = 0.085 cc/g |

The products submitted to the subsequent impregnation and polymerization treatments as reported in example No. 10, displayed the following characteristics:

| | | |
|---|---|---|
| a) | Degree of impregnation | = 12.5% by weight |
| b) | Mechanical resistance to compression | = 2,160 kg/cm² |
| c) | Water absorption | = 0.10% |
| d) | Abrasion (ASTM C 4 18-68) | = 1.5 g |

Example No. 12

Concrete manufactured with A.R.C. pozzolana cement and basaltic inert materials, granulometrically corresponding to the Fuller curve (P = 100 $\sqrt{d/D}$), with a maximum diameter of the aggregate = 10 mm and with ratios water/cement = 0.5 and binder/inert materials = 0.2, submitted to the ageing modalities as reported in example No. 10, displayed a mechanical resistance of 1,260 kg/cm² and a porosity of 0.0752 cc/g.

The products, submitted to the subsequent impregnation and polymerization treatments, using styrene as a monomer, and the same modalities of example No. 10 displayed the following characteristics:

| | | |
|---|---|---|
| a) | degree of impregnation | = 9.9% by weight |
| b) | mechanical resistance to compression | = 2,040 kg/cm² |
| c) | water absorption | = 0.21 % |
| d) | Abrasion (ASTM C4 18-68) | = 4.5 g |

Example No. 13

Mortars manufactured as in example No. 11, using as a binder a mixture of portland cement with a high silicic modulus (3.10) and with a low melting materials modulus, and of sand with a high (90%) SiO₂ content, in the proportions of 70:30, aged as in Example No. 11, displayed a mechanical resistance of 1,330 kg/cm² and a porosity of 0.085 cc/g.

The hereinbefore said products submitted to subsequent treatments as reported in Example No. 12, displayed the following characteristics:

| | | |
|---|---|---|
| a) | degree of impregnation | = 10% by weight |
| b) | Mechanical resistance to compression | = 2,200 kg/cm² |
| c) | water absorption | = 0.20% |
| d) | abrasion (ASTM C4 18-68) | = 4 g |

Having thus described the present invention, what is claimed is:

1. A process for manufacturing cement articles having very high mechanical strength, comprising
   a. forming articles of the desired shape from a member selected from the group consisting of mortar or concrete prepared from water and portland cement having a high silicic modulus, pozzolana cement, and a mixture consisting of 50 to 90% by weight of portland cement and 50 to 10% by weight of reactive siliceous material;
   b. pre-aging the articles at room temperature;
   c. steam curing the articles in an autoclave at a temperature from 150° to 250°C. for 1 to 6 hours; and
   d. maintaining the steam cured articles in an anhydrous environment at a temperature from 120° to 350°C. for 1 to 12 hours.

* * * * *